United States Patent
Salamon et al.

(10) Patent No.: US 12,120,113 B2
(45) Date of Patent: Oct. 15, 2024

(54) DISTRIBUTED / MULTI-LEVEL SERVER AUTHENTICATION

(71) Applicant: EMC IP Holding Company LLC, Hopkinton, MA (US)

(72) Inventors: Victor Salamon, Edmonton (CA); Paul Berube, Edmonton (CA)

(*) Notice: Subject to any disclaimer, the term of this patent is extended or adjusted under 35 U.S.C. 154(b) by 707 days.

(21) Appl. No.: 17/376,376

(22) Filed: Jul. 15, 2021

(65) Prior Publication Data
US 2023/0016852 A1    Jan. 19, 2023

(51) Int. Cl.
*H04L 29/06* (2006.01)
*H04L 9/40* (2022.01)
*H04L 67/01* (2022.01)

(52) U.S. Cl.
CPC ...... *H04L 63/0876* (2013.01); *H04L 63/0435* (2013.01); *H04L 63/20* (2013.01); *H04L 67/01* (2022.05); *H04L 2463/082* (2013.01)

(58) Field of Classification Search
CPC . H04L 63/0876; H04L 63/0435; H04L 63/20; H04L 67/01; H04L 2463/082; H04L 63/083; H04L 63/1441; H04W 12/041; H04W 12/12; H04W 12/06
See application file for complete search history.

(56) References Cited

U.S. PATENT DOCUMENTS

| | | | |
|---|---|---|---|
| 6,959,394 B1* | 10/2005 | Brickell | G06Q 20/3829 726/19 |
| 9,305,161 B1* | 4/2016 | Juels | H04L 9/085 |
| 2016/0156611 A1* | 6/2016 | Rozman | H04L 63/083 713/168 |
| 2017/0237725 A1* | 8/2017 | Camenisch | H04L 63/0435 713/171 |

OTHER PUBLICATIONS

U.S. Appl. No. 14/962,553, filed Dec. 8, 2015, entitled "Methods and Apparatus for Secret Sharing with Verifiable Reconstruction Type."

* cited by examiner

*Primary Examiner* — Baotran N To
(74) *Attorney, Agent, or Firm* — Krishnendu Gupta; Lesley Leonessa

(57) ABSTRACT

Methods, system, and non-transitory processor-readable storage medium for distributed and multi-level server authentication are provided herein. An example method includes receiving, by a plurality of second servers, a plurality of authentication secret slices, where a first server transmits each of the plurality of authentication secret slices to a respective second server of the plurality of second servers, receiving, by the first server, an authentication confirmation from each of the plurality of second servers and confirming, by the first server to a client, that an authentication request has succeeded.

18 Claims, 5 Drawing Sheets

DISTRIBUTED / MULTI-LEVEL SERVER AUTHENTICATION

FIELD

The field relates generally to information processing systems, and more particularly to data protection in such systems.

BACKGROUND

Current methods in password authentication rely on an authentication server matching a (hashed) secret from an authentication request, against a server record with the same (hashed) secret. The server's record of the secret may be exposed to attackers despite the best software protections, for example by a physical attack. The exposed secret can be then be used to facilitate further attacks and/or authentication breaches.

SUMMARY

Illustrative embodiments provide techniques for implementing a diverse storage locations and encryption system in a storage system. For example, illustrative embodiments receive, by a plurality of second servers, a plurality of authentication secret slices. A first server transmits each of the plurality of authentication secret slices to a respective second server of the plurality of second servers. Illustrative embodiments receive by the first server, an authentication confirmation from each of the plurality of second servers, and confirm, by the first server to a client, that an authentication request has succeeded. Other types of processing devices can be used in other embodiments.

These and other illustrative embodiments include, without limitation, apparatus, systems, methods and processor-readable storage media.

DETAILED DESCRIPTION

Figure 1:
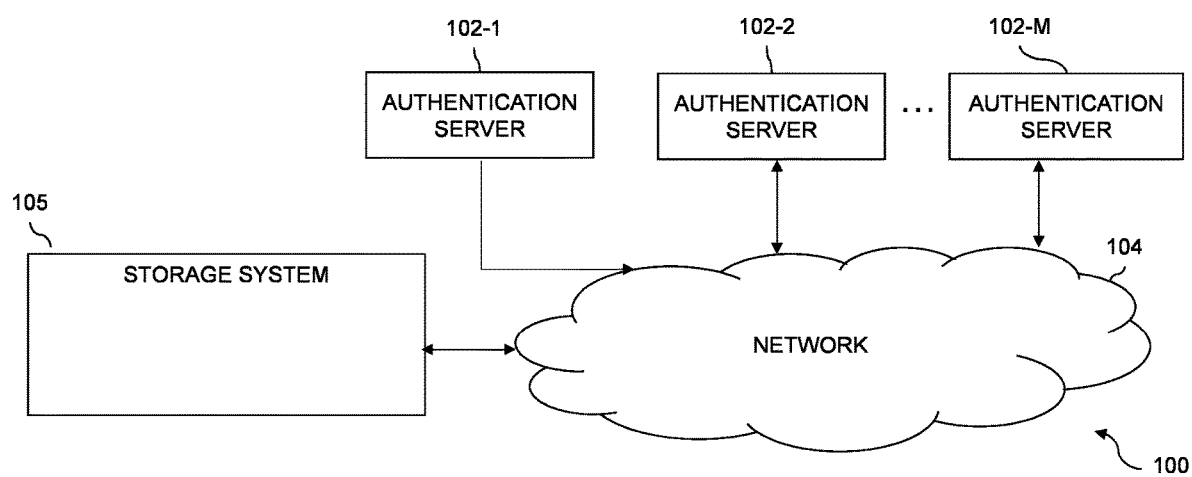
FIG. 1 shows an information processing system in an illustrative embodiment.

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Described below is a technique for use in implementing a distributed and multi-level server authentication system, which technique may be used to provide, among other things, a plurality of second servers receiving a plurality of authentication secret slices, where a first server transmits each of the plurality of authentication secret slices to a respective second server of the plurality of second servers. The first server receives an authentication confirmation from each of the plurality of second servers. The first server confirms to the client that an authentication request has succeeded.

Critical content, for example, passwords, are subject to attack from hackers even if those passwords are recorded in hash form on, for example, a server. Passwords are stored as a whole, and as contiguous pieces of information, adding to the vulnerability of passwords to hackers. Though hashed passwords are difficult to reverse engineer, it is not impossible.

Conventional approaches to storing passwords can be problematic. Secrets associated with passwords that are stored "as a whole" can be stolen by an attacker, either from a memory location on a client or server, or from a message. Despite attempts to secure these records, there are attack vectors not always in the control of the domain hosting the client or server. For example, a physical attack can provide physical access to copy the records from the client or server, the entire client or server can be physically stolen, or their storage device can be stolen, regardless of SW safeguards around communications (VPN, encrypted communication channels etc.).

The exposed secret can then be used to facilitate further attacks and/or authentication breaches. A security attack on the server on which the passwords are stored can open the door for hackers to breach other systems. For example, the attacker can setup another server with a similarly looking service, initiate a phishing attack on the user, and/or lure the user to use the new server. When the user attempts authentication on this alternate fake server, the authentication can succeed, because the fake server has a matching secret, even if the attacker doesn't know the password. From that point, the attacker can gain access to new private information the user may provide through this new authentication, or hop onto another service in a pre-authenticated way, and syphon further communications. The attacker can also use advanced technologies to reverse-engineer the secret back into the original password, passphrase and/or token. With their own copy of the secret, the attacker can employ repeated testing of the secret privately, without danger of detection of repeated testing/suspicious activities. The attacker can use a variety of combination methods, for example brute-force at large scale, and/or entire language dictionaries of words, known phrases, perhaps matching to other social clues/keywords about a targeted user. To speed up this undetected offline attack, the attacker can use supercomputers, distributed computing including botnets of previously-compromised hosts, and/or emerging technologies such as quantum computing. If the attacker has access to read the secret in the authentication server, the attacker may have access to replace an existing secret. The attacker can then authenticate using their replacement secret, and the attacker can then plant undesired information and/or corrupt the user's other data records on the server, even though those records are encrypted in some other way. Attackers may also add an unauthorized record and gain long-term access to the system by authenticating against this record.

Conventional technologies allow the secret to be accessible through one central record, "as a whole", on the client and server (RAM and/or persistent storage) and in one central message through the messaging system. Conventional technologies do not provide a way to eliminate the central aspect of storing passwords. Conventional technologies do not decentralize components of a password. Conventional technologies do not avoid storing sections of the password on contiguous storage space. Conventional technologies do not decentralize the "secret" associated with passwords such that there is no central point of attack (whether that be a client, server, in transit, and/or through messaging) from which to steal the secret.

By contrast, in at least some implementations in accordance with the current technique as described herein, in a distributed and multi-level server authentication system, a plurality of second servers receives a plurality of authentication secret slices, where a first server transmits each of the plurality of authentication secret slices to a respective second server of the plurality of second servers. The first server receives an authentication confirmation from each of the plurality of second servers. The first server confirms to the client that an authentication request has succeeded.

Thus, a goal of the current technique is to provide a method and a system for providing a distributed and multi-level server authentication system. Another goal is to decentralize the secret, such that there is no single record of the secret either on the client, server, in transit, and/or through messaging. Another goal is to store the slices on different servers instead of on a single authentication server. Another goal is to transmit this information through the network using different encryption schemes.

In at least some implementations in accordance with the current technique described herein, the use of a distributed and multi-level server authentication system can provide one or more of the following advantages: decentralizing passwords, "secrets", etc., so that there is no central point of attack from which to steal this critical information, eliminating the security vulnerability of storing passwords, "secrets", etc., "as a whole" (i.e., as a single and/or contiguous record), eliminating security breaches that result from a single system being hacked, and eliminating access to additional systems when one system has been compromised.

In contrast to conventional technologies, in at least some implementations in accordance with the current technique as described herein, in a distributed and multi-level server authentication system, a plurality of second servers receives a plurality of authentication secret slices, where a first server transmits each of the plurality of authentication secret slices to a respective second server of the plurality of second servers. The first server receives an authentication confirmation from each of the plurality of second servers. The first server confirms to the client that an authentication request has succeeded.

In an example embodiment of the current technique, the distributed and multi-level server authentication system transmits the plurality of authentication secret slices individually from the first server to each respective second server.

In an example embodiment of the current technique, the distributed and multi-level server authentication system transmits each authentication secret slice from the first server to the respective second server through an encrypted channel, where a plurality of encryption methods is utilized.

In an example embodiment of the current technique, the distributed and multi-level server authentication system receives, by the first server, the authentication request from the client, where the client processes authentication input into the plurality of authentication secret slices, and where the authentication request comprises the plurality of authentication secret slices.

In an example embodiment of the current technique, the distributed and multi-level server authentication system generates the authentication confirmation, by the second server, if a received authentication secret slice matches a registration secret slice persisted on the second server.

In an example embodiment of the current technique, the distributed and multi-level server authentication system performs a registration process between the client and the second server.

In an example embodiment of the current technique, the distributed and multi-level server authentication system receives, by the first server, a registration request from the client, where the client processes registration input into a plurality of registration secret slices, and where the registration request comprises the plurality of registration secret slices. The plurality of second servers receives the plurality of registration secret slices, where the first server transmits each of the plurality of registration secret slices to a respective second server of the plurality of second servers. The first server receives confirmation from each of the plurality of second servers that each received registration secret slice has been persisted on the respective second server. The first server confirms to the client that the registration request has succeeded.

In an example embodiment of the current technique, the distributed and multi-level server authentication system transmits the plurality of registration secret slices individually from the first server to each respective second server.

In an example embodiment of the current technique, the distributed and multi-level server authentication system persists, by each of the plurality of second servers, a respective received registration secret slice and a username associated with the plurality of registration secret slices.

In an example embodiment of the current technique, the distributed and multi-level server authentication system receives, by the client, a registration request or an authentication request along with request input. The client processes the request input into a secret, and splits the secret into a plurality of secret slices.

In an example embodiment of the current technique, an assembly order of the plurality of secret slices is associated with the plurality of secret slices.

In an example embodiment of the current technique, a sequence order is encoded in each of the plurality of secret slices.

In an example embodiment of the current technique, the distributed and multi-level server authentication system transmits the plurality of secret slices from the client to the first server in a random order.

In an example embodiment of the current technique, the distributed and multi-level server authentication system maintains, on the first server, a sequence number associated with each of the plurality of secret slices, and identification of a respective second server of the plurality of second servers to which each of the plurality of secret slices is transmitted.

In an example embodiment of the current technique, the distributed and multi-level server authentication system hashes at least one of the secret slices from the first server to the second server.

FIG. 1 shows a computer network (also referred to herein as an information processing system) 100 configured in accordance with an illustrative embodiment. The computer network 100 comprises a plurality of authentication servers 102-1, 102-2, . . . 102-M, collectively referred to herein as authentication servers 102. The authentication servers 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a storage system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

The authentication servers 102 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The authentication servers 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Figure 2:
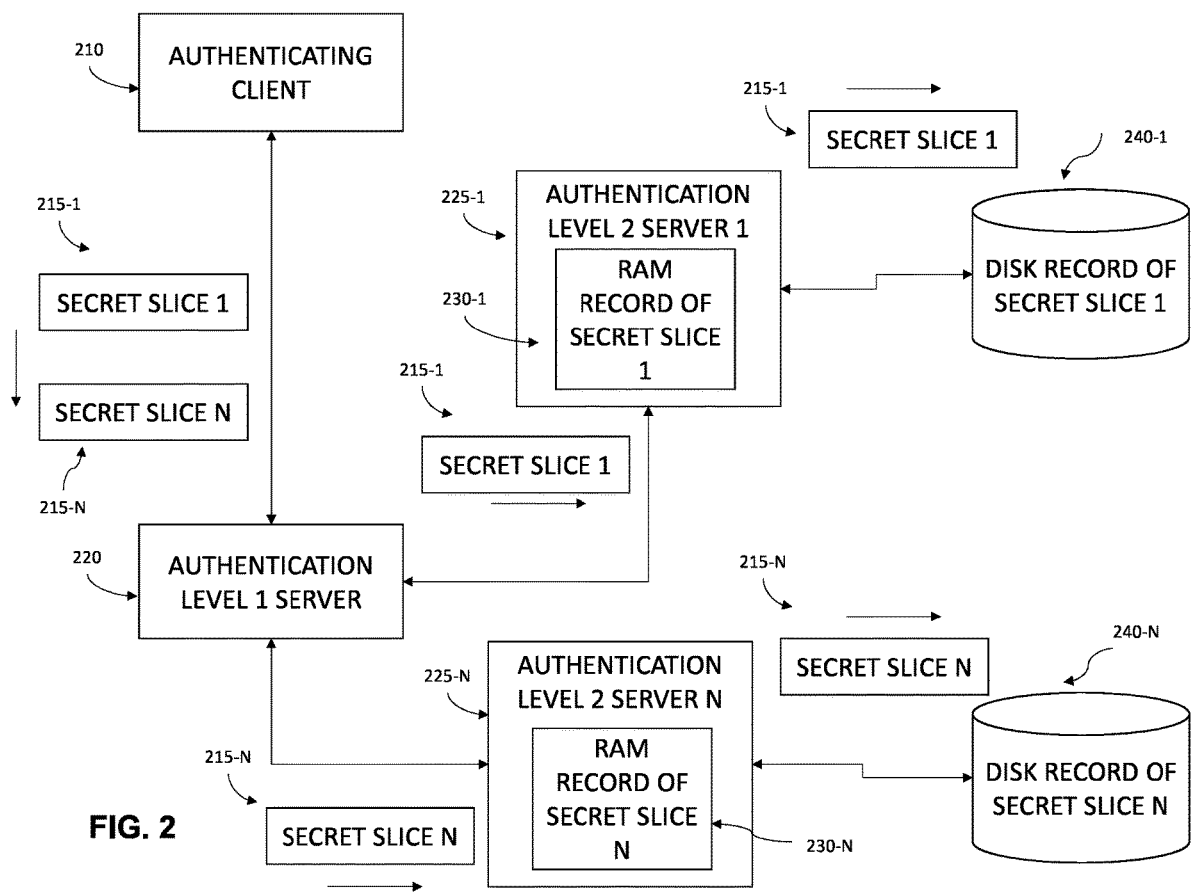
FIG. 2 shows an example of a distributed and multi-level server authentication system in an illustrative embodiment.

Also associated with the storage system 105 are one or more input-output devices, which illustratively comprise keyboards, displays or other types of input-output devices in any combination. Such input-output devices can be used, for example, to support one or more user interfaces to the storage system 105, as well as to support communication between storage system 105 and other related systems and devices not explicitly shown. For example, a user may provide registration and/or authentication input into storage system 105 as the authenticating client, as illustrated in FIG. 2. One or more input-output devices may also be associated with any of the authentication servers 102.

Additionally, the storage system 105 in the FIG. 1 embodiment is assumed to be implemented using at least one processing device. Each such processing device generally comprises at least one processor and an associated memory, and implements one or more functional modules for controlling certain features of the storage system 105.

More particularly, the storage system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the storage system 105 to communicate over the network 104 with the authentication servers 102, and illustratively comprises one or more conventional transceivers.

A distributed and multi-level server authentication system may be implemented at least in part in the form of software that is stored in memory and executed by a processor, and may reside in any of storage system 105 and/or authentication servers 102. The distributed and multi-level server authentication system may be a standalone plugin that may be included within a processing device. That processing device may be any of storage system 105, authentication servers 102, or any other processing device. The distributed and multi-level server authentication system may reside on processing devices separate from storage system 105 and/or authentication servers 102. In this example scenario, any of storage system 105 and authentication servers 102 may send and receive messages to the separate processing devices to access the methods of the distributed and multi-level server authentication system.

It is to be understood that the particular set of elements shown in FIG. 1 for storage system 105 involving authentication servers 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the storage system 105 can be on and/or part of the same processing platform.

An exemplary process of an example distributed and multi-level server authentication system using storage system 105 and authentication servers 102 in computer network 100 will be described in more detail with reference to, for example, the flow diagram of FIG. 3.

Referring now to FIG. 2, this figure shows an example of a distributed and multi-level server authentication system in an illustrative embodiment. An authenticating client 210 is in communication with authentication level 1 server 220 for password registration and authentication. In an example embodiment, the authenticating client 210 may communicate directly with authentication level 2 servers 225-1 through 225-N for password registration and authentication. The authenticating client 210 processes an input, such as a username and password, passphrase, and/or other tokens into a secret. The authenticating client 210 generates the secret into multiple slices, for example, secret slice 1 215-1 through secret slice N 215-N. In an example embodiment, the secret slices contain information about reassembly order. In an example embodiment, the authenticating client 210 avoids storing the secret in the same memory location or message. In an example embodiment, to avoid storing the secret slices in a continuous record, embodiments disclosed herein read and process the secret slices separately from and into diverse locations, using diverse methods of encryption. For example, for storage, across purposely different disks, file systems, files, etc., and for CPU processing, across purposely different, discontiguous, randomized, etc., memory locations. Thus, even if an attacker can copy the entire memory space of the client or server, the attacker wouldn't know which memory location is for which slices. The attacker wouldn't know the order in which to reassemble the slices, and the attacker wouldn't understand how to interpret the semantics of the reassembly. Thus, embodiments disclosed herein split up secret keys and authentication responses into slices across multiple levels, machines, and encryption methods etc., so that the slices are never together either in memory or on disk, never on the same authentication server, and in some embodiments, never using the same encryption methods.

The authenticating client 210 transmits the secret slice 1 215-1 through secret slice N 215-N to the authentication level 1 server 225-1. In an example embodiment, the secret slices are transmitted in independent messages in random order. Each slice has a sequency encoded into it (i.e., "slice X out of N"). In an example embodiment, the splitting of the secret into multiple secret slices prevents authentication level 1 server 225-1 from being able to assemble the set of secret slices together. The authentication level 1 server 225-1 may temporarily record these responses in volatile memory, such as RAM record of secret slice 1 230-1 and/or RAM record of secret slice N 230-N. The authentication level 1 server 225-1 avoids interpreting or reassembling the secret slices into "the whole" original secret, and instead, sends each secret slice N 215-N to a separate authentication level 2 server 225-N. Thus, if authentication level 1 server 225-1 suffers a security attack, the attacker would not have access to the secret fully assembled, since the secret slices are stored in diverse locations on the authentication level 1 server 225-1.

In an example embodiment, as each secret slice N 215-N arrives, the authentication level 1 server 225-1 hashes the secret slice N 215-N into a corresponding authentication level 2 server 225-N. In an example embodiment, the authentication level 1 server 225-1 sends each slice to a separate authentication level 2 server 225-N over an encrypted channel, as each slice is received by the authentication level 1 server 225-1 from the authenticating client 210. In an example embodiment, the authentication level 1 server 225-1 stores in a table the sequence number associated with each slice, along with authentication level 2 server 225-N information to which each secret slices was sent. In an example embodiment, the authentication level 1 server 225-1 stores this information to track future completion of responses received from the authentication level 2 server 225-N.

In an example embodiment, during the password registration process, each authentication level 2 server 225-N stores a respective secret slice N 215-N (corresponding to a username) to persistent records, for example, disk record of secret slice 1 240-1 and/or disk record of secret slice N 240-N, for future retrieval during the password authentication process.

Figure 3:
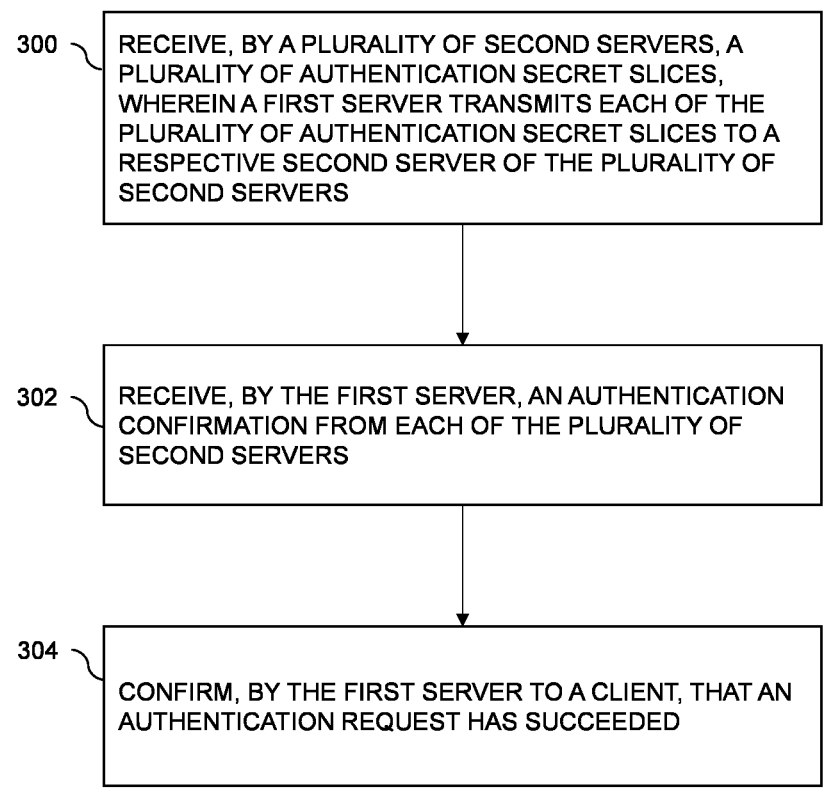
FIG. 3 shows a flow diagram of a process for a distributed and multi-level server authentication system in an illustrative embodiment.

FIG. 3 is a flow diagram of a process for a distributed and multi-level server authentication system in an illustrative embodiment. It is to be understood that this particular process is only an example, and additional or alternative processes can be carried out in other embodiments.

In an example embodiment, the client, authenticating client 210, may receive either a registration request or an authentication request along with request input, such as a username, password, passphrase, token, etc., for example, from a user. The client, authenticating client 210, processes the request input into a secret, and splits the secret into a plurality of secret slices, secret slice 1 215-1 through secret slice N 215-N. In an example embodiment, an assembly order of the plurality of secret slices is associated with the plurality of secret slices. In another example embodiment, a sequence order is encoded in each of the plurality of secret slices. In an example embodiment, the client, authenticating client 210, transmits the plurality of secret slices, secret slice 1 215-1 through secret slice N 215-N, from the authenticating client 210 to the first server, authentication level 1 server 225-1, in a random order. In an example embodiment, the first server, authentication level 1 server 225-1, hashes at least one of the secret slices, secret slice N 215-N, from the first server authentication level 1 server 225-1 to the second server, authentication level 2 server 225-N. In an example embodiment, the first server, authentication level 1 server 225-1, maintains a sequence number associated with each of the plurality of secret slices, secret slice 1 215-1 through secret slice N 215-N, and identification of a respective second server, authentication level 2 server 225-N of the plurality of second servers to which each of the plurality of secret slices is transmitted.

In an example embodiment, the distributed and multi-level server authentication system performs a registration process between the client and the second server. In an example embodiment, the first server, authentication level 1 server 225-1, receives a registration request from the client, authenticating client 210. In an example embodiment, the client, authenticating client 210, receives registration input, such as a username, password, passphrase, token, etc., for example, from a user. The client, authenticating client 210, processes the registration input into the plurality of registration secret slices. In an example embodiment, the first server, authentication level 1 server 225-1, receives a registration request from the client, authenticating client 210, where the registration request comprises the plurality of registration secret slices. In an example embodiment, the first server, authentication level 1 server 225-1, transmits each of the plurality of registration secret slices to a respective second server of the plurality of second servers. In an example embodiment, the first server, authentication level 1 server 225-1, transmits the plurality of registration secret slices individually from the first server, authentication level 1 server 225-1, to each respective second server, authentication level 2 server 225-N. In an example embodiment, each of the plurality of second servers, authentication level 2 server 225-N, persists a respective received registration secret slice and, for example, a username associated with the plurality of registration secret slices, for example, in a disk record of secret slice N 240-N. In response, the first server, authentication level 1 server 225-1, receives confirmation from each of the plurality of second servers, authentication level 2 server 225-N, that each received registration secret slice has been persisted on the respective second server, authentication level 2 server 225-N, for example, in a disk record of secret slice N 240-N. In another example embodiment, the second server, authentication level 2 server 225-N, may persist the registration secret slice, secret slice N 215-N, on RAM memory on the second server, authentication level 2 server 225-N. The first server, authentication level 1 server 225-1, then confirms to the client, authenticating client 210, that the registration request has succeeded.

In an example embodiment, the client, authenticating client 210, receives authentication input, such as a username, password, passphrase, tokens, etc., for example, from a user. The client, authenticating client 210, processes the authentication input into the plurality of authentication secret slices. In an example embodiment, the first server, authentication level 1 server 225-1, receives an authentication request from the client, authenticating client 210, where the authentication request comprises the plurality of authentication secret slices.

At 300, a plurality of second servers, authentication level 2 server 225-N, receives a plurality of authentication secret slices. The first server, authentication level 1 server 225-1, transmits each of the plurality of authentication secret slices to a respective second server of the plurality of second servers, authentication level 2 server 225-N. In an example embodiment, the authentication level 1 server 225-1 transmits the plurality of authentication secret slices individually from the first server, authentication level 1 server 225-1, to each respective second server, authentication level 2 server 225-N. In an example embodiment, the first server, authentication level 1 server 225-1, transmits each authentication secret slice from the first server, authentication level 1 server 225-1, to the respective second server, authentication level 2 server 225-N, through an encrypted channel, where a plurality of encryption methods is utilized. Thus, the "secret" associated with passwords is decentralized such that there is no central point of attack (whether that be a client, server, in transit, and/or through messaging) from which to steal the secret.

In an example embodiment, the plurality of encryption methods may be on the authenticating client 210, the first server, authentication level 1 server 225-1, the encrypted channel, and/or the respective second server, authentication level 2 server 225-N. In an example embodiment, each of the second servers, authentication level 2 server 225-N, performs a comparison between the received authentication secret slice, secret slice N 215-N, and a registration secret slice that is persisted on that second server, authentication level 2 server 225-N, for example, in the disk record of secret slice N 240-N. In an example embodiment, the authentication level 2 server 225-N, looks up the received authentication secret slice, secret slice N 215-N, associated with the username, and attempts to match the received authentication secret slice received from authentication level 1 server 225-1, with a registration secret slice previously persisted in the disk record of secret slice N 240-N. Each authentication level 2 server 225-N responds to authentication level 1 server 225-1 with either a "yes" (for a match), or "no" (for no match). In response, authentication level 1 server 225-1, records the yes/no answers in a table established during the registration process. As each authentication level 2 server 225-N transmits either a "yes" or "no" to authentication level 1 server 225-1, authentication level 1 server 225-1, temporarily records these responses in RAM record of secret slice N 230-N. In an example embodiment, the responses recorded by authentication level 1 server 225-1 are simply the confirmation messages received from each respective authentication level 2 server 225-N. These confirmation messages, as well as the received authentication secret slices, are dispersed throughout RAM record of secret slice N 230-N, thus making authentication level 1 server 225-1 more resistant to an attack.

At 304, the first server, authentication level 1 server 225-1, confirms to the client, that an authentication request has succeeded. In an example embodiment, for each authentication request received, each of the authentication level 2 server 225-N perform this comparison for the respective received authentication secret slice. In an example embodiment, each authentication level 2 server 225-N generates an authentication confirmation, if the received authentication secret slice matches a registration secret slice persisted on the second server, authentication level 2 server 225-N. When the authentication level 1 server 225-1 collects all the responses from the plurality of authentication level 2 servers 225-N, if all authentication level 2 servers 225-N have responded with "yes", then the authentication level 1 server 225-1 confirms to authenticating client 210 that the authentication request has succeeded. If any of the authentication level 2 servers 225-N respond with "no", the authentication level 1 server 225-1 then confirms to the authenticating client 210 that the authentication request has failed. At 302, the authentication level 1 server 225-1 receives an authentication confirmation from each of the plurality of second servers, authentication level 2 server 225-N. In an example embodiment, when the authentication level 1 server 225-1 determines the authentication request has succeeded, the authentication level 1 server 225-1 may create an authenticated session token (to execute further commands). The authentication level 1 server 225-1 may also execute a one-time command that was received with, for example, one of the authentication secret slices that authentication level 1 server 225-1 received from authenticating client 210.

In an example embodiment, the distributed and multi-level server authentication system may be implemented with the authenticating client 210 and the authentication level 2 server 225-N. In this example scenario, the authenticating client 210 would split the registration and/or authentication request into a plurality of secret slices, secret slice N 215-N, and transmit the secret slices, secret slice N 215-N, individually from the authenticating client 210 directly to the authentication level 2 server 225-N.

Accordingly, the particular processing operations and other functionality described in conjunction with the flow diagram of FIG. 3 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to significantly improve processing device security. For example, some embodiments are configured to provide at least one of: decentralizing passwords, "secrets", etc., so that there is no central point of attack from which to steal this critical information, eliminating the security vulnerability of storing passwords, "secrets", etc., "as a whole" (i.e., as a single and/or contiguous record), eliminating security breaches that result from a single system being hacked, and eliminating access to additional systems when one system has been compromised. These and other embodiments can effectively improve how data is protected relative to conventional approaches.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 4 and 5. Although described in the context of system 100, these platforms may also be used to implement at least portions of other information processing systems in other embodiments.

Figure 4:
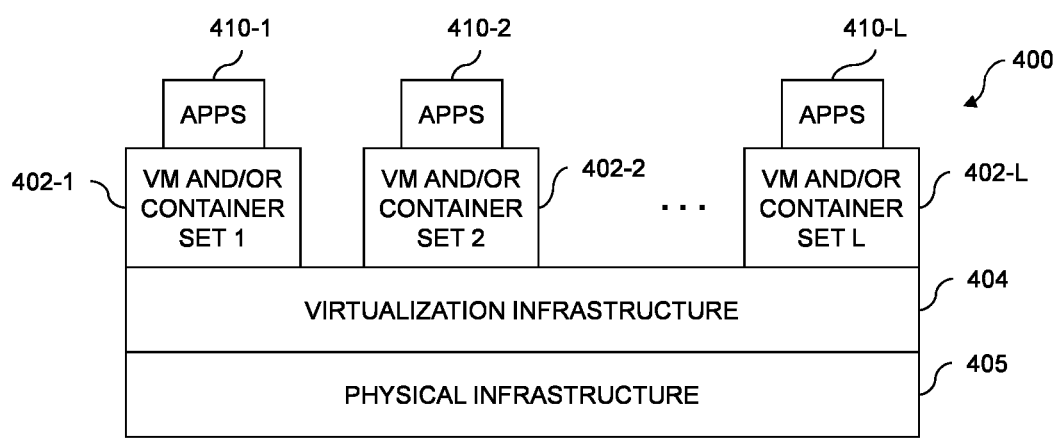
FIGS. 4 and 5 show examples of processing platforms that may be utilized to implement at least a portion of a distributed and multi-level server authentication embodiments.
Figure 5:
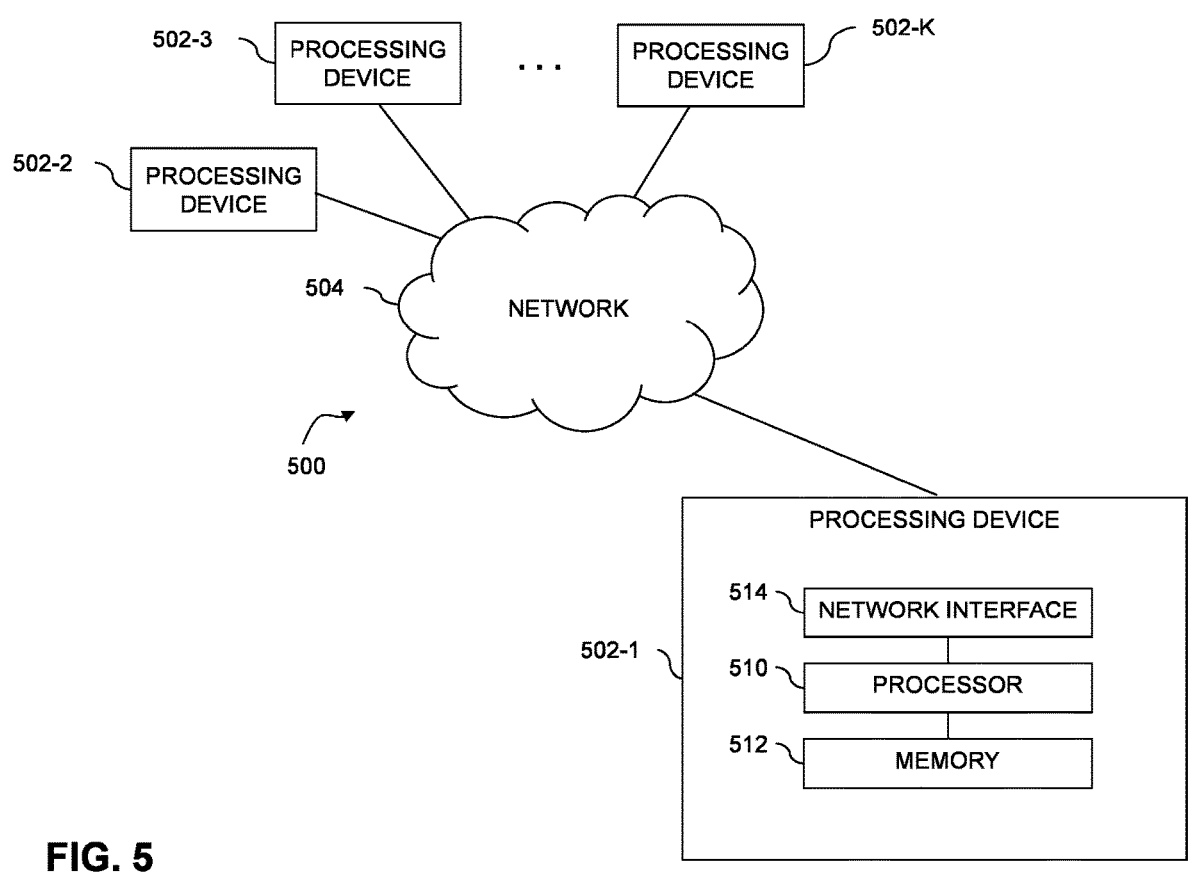

FIG. 4 shows an example processing platform comprising cloud infrastructure 400. The cloud infrastructure 400 comprises a combination of physical and virtual processing resources that are utilized to implement at least a portion of the information processing system 100. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 comprise respective VMs, respective sets of one or more containers, or respective sets of one or more containers running in VMs. In some implementations of the FIG. 4 embodiment, the VMs/container sets 402 comprise respective VMs implemented using virtualization infrastructure 404 that comprises at least one hypervisor.

A hypervisor platform may be used to implement a hypervisor within the virtualization infrastructure 404, where the hypervisor platform has an associated virtual infrastructure management system. The underlying physical machines comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 502-1 in the processing platform 500 comprises a processor 510 coupled to a memory 512.

The processor 510 comprises a microprocessor, a microcontroller, an application-specific integrated circuit (ASIC), a field-programmable gate array (FPGA) or other type of processing circuitry, as well as portions or combinations of such circuitry elements.

The memory 512 comprises random access memory (RAM), read-only memory (ROM) or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   receiving, by a plurality of second servers, a plurality of authentication secret slices, wherein a first server transmits each of the plurality of authentication secret slices to a respective second server of the plurality of second servers;
   receiving, by the first server, an authentication confirmation from each of the plurality of second servers;
   confirming, by the first server to a client, that an authentication request has succeeded;
   processing, by the client, a request input into a secret;
   splitting, by the client, the secret into a plurality of secret slices;
   transmitting the plurality of secret slices from the client to the first server in a random order; and
   maintaining, on the first server, a sequence number associated with each of the plurality of secret slices, and identification of a respective second server of the plurality of second servers to which each of the plurality of secret slices is transmitted.

2. The method of claim 1 wherein receiving, by the plurality of second servers, the plurality of authentication secret slices comprises:
   transmitting the plurality of authentication secret slices individually from the first server to each respective second server.

3. The method of claim 2 wherein transmitting the plurality of authentication secret slices individually from the first server to the second server comprises:
   transmitting each authentication secret slice from the first server to the respective second server through an encrypted channel, wherein a plurality of encryption methods is utilized.

4. The method of claim 1 wherein receiving, by the plurality of second servers, the plurality of authentication secret slices comprises:
   receiving, by the first server, the authentication request from the client, wherein the client processes authentication input into the plurality of authentication secret slices, wherein the authentication request comprises the plurality of authentication secret slices.

5. The method of claim 1 wherein receiving, by the plurality of second servers, the plurality of authentication secret slices comprises:
   generating the authentication confirmation, by the second server, if a received authentication secret slice matches a registration secret slice persisted on the second server.

6. The method of claim 1 wherein receiving, by the plurality of second servers, the plurality of authentication secret slices comprises:
performing a registration process between the client and the second server.

7. The method of claim 6 wherein performing the registration process between the client and the second server comprises:
receiving, by the first server, a registration request from the client, wherein the client processes registration input into a plurality of registration secret slices, wherein the registration request comprises the plurality of registration secret slices;
receiving, by the plurality of second servers, the plurality of registration secret slices, wherein the first server transmits each of the plurality of registration secret slices to a respective second server of the plurality of second servers;
receiving, by the first server, confirmation from each of the plurality of second servers that each received registration secret slice has been persisted on the respective second server; and
confirming, by the first server to the client, that the registration request has succeeded.

8. The method of claim 7 wherein receiving, by the plurality of second servers, the plurality of registration secret slices comprises:
transmitting the plurality of registration secret slices individually from the first server to each respective second server.

9. The method of claim 7 wherein receiving, by the plurality of second servers, the plurality of registration secret slices comprises:
persisting, by each of the plurality of second servers, a respective received registration secret slice and a username associated with the plurality of registration secret slices.

10. The method of claim 1 further comprising:
receiving, by the client, a registration request or an authentication request along with request input.

11. The method of claim 10 wherein an assembly order of the plurality of secret slices is associated with the plurality of secret slices.

12. The method of claim 10 wherein a sequence order is encoded in each of the plurality of secret slices.

13. The method of claim 1 further comprising: hashing at least one of the secret slices from the first server to the second server.

14. A system comprising:
at least one processing device comprising a processor coupled to a memory;
the at least one processing device being configured:
to receive, by a plurality of second servers, a plurality of authentication secret slices, wherein a first server transmits each of the plurality of authentication secret slices to a respective second server of the plurality of second servers;
to receive, by the first server, an authentication confirmation from each of the plurality of second servers;
to confirm, by the first server to a client, that an authentication request has succeeded;
to process, by the client, the request input into a secret;
to split, by the client, the secret into a plurality of secret slices;
to transmit the plurality of secret slices from the client to the first server in a random order; and
to maintain, on the first server, a sequence number associated with each of the plurality of secret slices, and identification of a respective second server of the plurality of second servers to which each of the plurality of secret slices is transmitted.

15. The system of claim 14 wherein the at least one processing device configured to receive, by the plurality of second servers, the plurality of authentication secret slices is further configured to:
transmit the plurality of authentication secret slices individually from the first server to each respective second server.

16. The system of claim 14 wherein the at least one processing device configured to receive, by the plurality of second servers, the plurality of authentication secret slices is further configured to:
generate the authentication confirmation, by the second server, if a received authentication secret slice matches a registration secret slice persisted on the second server.

17. The system of claim 14 further configured to:
receive, by the client, a registration request or an authentication request along with request input.

18. A computer program product comprising a non-transitory processor-readable storage medium having stored therein program code of one or more software programs, wherein the program code when executed by at least one processing device causes said at least one processing device:
to receive, by a plurality of second servers, a plurality of authentication secret slices, wherein a first server transmits each of the plurality of authentication secret slices to a respective second server of the plurality of second servers;
to receive, by the first server, an authentication confirmation from each of the plurality of second servers;
to confirm, by the first server to a client, that an authentication request has succeeded;
to receive, by the client, a registration request or an authentication request along with request input;
to process, by the client, the request input into a secret;
to split, by the client, the secret into a plurality of secret slices;
to transmit the plurality of secret slices from the client to the first server in a random order and to maintain, on the first server, a sequence number associated with each of the plurality of secret slices, and identification of a respective second server of the plurality of second servers to which each of the plurality of secret slices is transmitted.

* * * * *